United States Patent
Huang (10) Patent No.: US 11,496,932 B2
(45) Date of Patent: Nov. 8, 2022

(54) BEACON-BASED HANDOVER OPTION FOR COMMISSIONING AND CONTROL OF WIRELESS NETWORK DEVICES

(71) Applicant: SIGNIFY HOLDING B.V., Eindhoven (NL)

(72) Inventor: Haiming Huang, Shanghai (CN)

(73) Assignee: SIGNIFY HOLDING B.V., Eindhoven (NL)

(*) Notice: Subject to any disclaimer, the term of this patent is extended or adjusted under 35 U.S.C. 154(b) by 130 days.

(21) Appl. No.: 16/978,454

(22) PCT Filed: Feb. 25, 2019

(86) PCT No.: PCT/EP2019/054593
§ 371 (c)(1),
(2) Date: Sep. 4, 2020

(87) PCT Pub. No.: WO2019/170462
PCT Pub. Date: Sep. 12, 2019

(65) Prior Publication Data
US 2021/0051538 A1     Feb. 18, 2021

(30) Foreign Application Priority Data

Mar. 5, 2018 (WO) ................. PCT/CN2018/078048
May 15, 2018 (EP) ....................................... 18172350

(51) Int. Cl.
*H04W 36/00*     (2009.01)
*H04W 76/15*     (2018.01)
(Continued)

(52) U.S. Cl.
CPC ......... *H04W 36/0069* (2018.08); *H04W 4/80* (2018.02); *H04W 36/0011* (2013.01);
(Continued)

(58) Field of Classification Search
CPC ............... H04W 36/0069; H04W 4/80; H04W 36/0011; H04W 36/14; H04W 76/15; H04W 84/18; H04W 36/00; H04W 48/10
See application file for complete search history.

(56) References Cited

U.S. PATENT DOCUMENTS

2007/0019672 A1*   1/2007   Guthrie ................. H04W 88/06
                                                                                         370/310
2007/0147334 A1*   6/2007   Guthrie ................... H04W 4/08
                                                                                         370/349
(Continued)

FOREIGN PATENT DOCUMENTS

EP            2696648 A1     2/2014
WO      2017014645 A1    1/2017

*Primary Examiner* — Hassan A Phillips
*Assistant Examiner* — Hicham B Foud (57) ABSTRACT

The present invention relates to methods and apparatuses for controlling commissioning and/or control of a combo network device with dual connectivity in a wireless network by using a smart device. In a factory new state, the combo network device has not yet joined any wireless network by its first connectivity (e.g. Zigbee) and thus broadcasts a beacon with beacon information to solicit a connection from the smart device by its second connectivity (e.g. BLE). If the combo network device joins a wireless network, it enters an associated state in which the beacon information will now contain an identification of the wireless network. Thus, the beacon information changes based on the status of the combo network device and supports a handover process for an installer or controller.

15 Claims, 2 Drawing Sheets

(51) Int. Cl.
*H04W 4/80* (2018.01)
*H04W 36/14* (2009.01)
*H04W 84/18* (2009.01)

(52) U.S. Cl.
CPC ........... *H04W 36/14* (2013.01); *H04W 76/15* (2018.02); *H04W 84/18* (2013.01)

(56) References Cited

U.S. PATENT DOCUMENTS

| | | | |
|---|---|---|---|
| 2009/0026966 A1* | 1/2009 | Budde | H05B 47/19 315/152 |
| 2010/0046468 A1* | 2/2010 | Oi | H04W 84/20 370/331 |
| 2012/0299509 A1* | 11/2012 | Lee | H04L 61/6081 315/291 |
| 2013/0309971 A1 | 11/2013 | Kiukkonen et al. | |
| 2016/0021485 A1 | 1/2016 | Sallas et al. | |
| 2016/0105424 A1 | 4/2016 | Logue et al. | |
| 2016/0150465 A1* | 5/2016 | Jung | H04W 8/005 370/254 |
| 2016/0286342 A1 | 9/2016 | Maddocks et al. | |
| 2016/0374133 A1 | 12/2016 | Logue et al. | |
| 2019/0069215 A1* | 2/2019 | Abouelseoud | H04W 40/244 |

* cited by examiner

BEACON-BASED HANDOVER OPTION FOR COMMISSIONING AND CONTROL OF WIRELESS NETWORK DEVICES

CROSS-REFERENCE TO PRIOR APPLICATIONS

This application is the U.S. National Phase application under 35 U.S.C. § 371 of International Application No. PCT/EP2019/054593, filed on Feb. 25, 2019, which claims the benefits of European Patent Application No. 18172350.3, filed on May 15, 2018, and Patent Application No. PCT/CN2018/078048, filed on Mar. 5, 2018. These applications are hereby incorporated by reference herein.

FIELD OF THE INVENTION

The invention relates to the field of commissioning of network devices in wireless networks, such as but not limited to Zigbee networks, for use in various different applications for home, office, retail, hospitality and industry.

BACKGROUND OF THE INVENTION

Zigbee networks represent another type of a low-power/low-cost wireless networks which allow multi-hop communication among devices in a mesh topology. Zigbee devices offer reduced power consumption and cost, together with mesh networking capability, which make them suitable for use in large-scale deployments. Examples of application of Zigbee mesh networks include home automation, building automation, retail services, smart energy, and wireless indoor lighting systems.

During initial setup, a Zigbee device performs a commissioning procedure to obtain a network key used to encrypt communication between devices in the network. Commissioning is a process in which a new Zigbee network is set up or a new Zigbee device is added to an existing network. However, for a factory-new device, there may be a security risk when automatically searching for and joining a Zigbee network. The new device could join the wrong Zigbee network, if that network was opened, especially in case the user does not yet own an access device.

Therefore, an auxiliary point-to-point connectivity (second connectivity, such as a Bluetooth or the like) has been added to provide "combo" network devices with dual connectivity including an enhanced user interface to an external commissioning device (e.g. tablet, smartphone). The dual connectivity can be achieved by combo chip which enable the dual connectivity. The additional point-to-point connection of the second connectivity can be used to exchange information required for the joining procedure and to inform the combo network device that it should search for and join a (specific) wireless network by using its first connectivity. This allows the user to seamlessly transfer from controlling the combo device via the point-to-point connection to controlling the combo device via a joined wireless network and a bridge device.

In a standalone lighting control system, a bridge/gateway device is used to connect to an installer's smart device (i.e. commissioning device) to do commissioning, configuration and maintenance. However, such an architecture has a limited range of wireless coverage of the bridge/gateway device. Imagine a large installation site, the wireless coverage will not always work when an installer is moving away from the bridge/gateway.

SUMMARY OF THE INVENTION

It is an object of the present invention to provide a reliable commissioning approach for networks with large distances.

This object is achieved by an apparatus as claimed in claim 1 or 5, by a commissioning and/or control device as claimed in claim 4, by a luminaire device as claimed in claim 11, by a lighting system as claimed in claim 12, by a method as claimed in claim 13 or 14, and by a computer program product as claimed in claim 15.

According to a first aspect directed to the commissioning and/or control device, a network node of a first connectivity to a wireless network is commissioned and/or controlled via a point-to-point connection of a second connectivity to a master device which provides the first connectivity and the second connectivity, wherein a potential new master device is selected based on a network identification derived from a beacon signal received from the potential new master device via the second connectivity, and the point-to-point connection is handed over from the master device to the selected potential new master device.

The network identification could be a PANID, and/or an IEEE address of a coordinator or a normal node for a static scenario.

As an example, the handover may be based on a predetermined handover criterion, such as a detection that the quality of the point-to-point connection to the master device falls below a predetermined threshold.

According to a second aspect directed to a network node (e.g. luminaire device), commissioning and/or control in a wireless network of a first connectivity is controlled via a point-to-point connection of a second connectivity, wherein a content of a beacon signal of the network node is changed so as to add a network indication or identification to the beacon signal in response to a detection that the network node has joined the wireless network, and the beacon signal is broadcast from the network node by using the second connectivity.

Accordingly, a beacon information broadcasted by the second connectivity can be used to indicate which network a network node belongs to, if it is already associated to the network via the first connectivity. This provides the advantage that a handover process can be provided for the commissioning and/or control device of an installer or controller so that a continuous connection to a suitable master device can be maintained to form a software gateway for commission, configuration and maintenance.

It is proposed that a software gateway enabled network control system is used for lighting networks. The software gateway solution offers an automatic setting up of a new connection between the commissioning and/or control, device and another combo network device. For this type of system, the commissioning and/or control device will hook up with one of the combo network devices (e.g., a smart luminaire device) by using the second connectivity to form a software gateway during commissioning, configuration and maintenance. However, when commissioning or controlling large networks, the installer will move around with the smart device, so that the wireless connection of the second connectivity between the smart device and a selected master combo network device (e.g. master lamp) will fade away as the distance increases.

The proposed handover process can be used for roaming purposes, while a user (e.g. installer) moves away from an original master device, to connect to another device and allow continued control. Moreover, the proposed handover process can be used in connection with a re-entry operation, when the user (e.g. installer) revisits a site and needs to re-enter the network again, e.g., for control purposes.

According to a first option of the first aspect, the point-to-point connection may be used for initiating a joining procedure for the network node by the master device using the first connectivity. Thus, the installer can move around in the network with the commissioning device and trigger joining procedures for network nodes.

According to a second option of the first aspect, which can be combined with the above first option, a gateway functionality may be provided for the wireless network via the point-to-point connection. Thereby, the commissioning and/or control device can act as gateway through which the joining process can be controlled.

As an example of both first and second aspects, the first connectivity is provided by a Zigbee connection and the second connectivity is provided by a BLE connection. Thereby, commissioning and other control functions in the multi-hop Zigbee network can be controlled via an energy-efficient BLE point-to-point connection.

According to a first option of the second aspect, the content of the beacon signal may be changed so as to indicate a special operation state in response to a receipt of beacon configuration command, wherein the beacon signal may be configured based on a beacon information included in the beacon configuration command. This measure allows to control the beacon signal and its content via an external beacon configuration command transmitted e.g. by the commissioning and/or control device. In a specific example, the beacon configuration command may include an information which triggers the network node to broadcast no beacon signal as all.

According to a second option of the second aspect, which may be combined with the above first option, the network indication or identification may be identified by at least one of a coordinator IEEE address, a normal node IEEE address, and a personal area network identification. Thereby, the broadcast network indication or identification can be readily derived from information that is already available in the wireless network.

According to a third option of the second aspect, which may be combined with the above first or second option, the operation state and the network indication or identification may be incorporated into different portions of a beacon identification. This provides the advantage that an available information of a beacon format can be used for signaling the state information and the network information in an efficient manner.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the apparatus, the commissioning and/or control device, the luminaire device, the lighting system, the method, and the computer program product of the above aspects may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Embodiments of the present invention are now described based on a Zigbee network as an example of a wireless network and a Bluetooth Low Energy (BLE) connection as an example of an auxiliary point-to-point connection used for commissioning.

Recent advances in integrated circuit design have made it possible to combine BLE and Zigbee technology on a single radio chip, allowing a low-power/low-cost device to operate as part of both a BLE network and a Zigbee network at the same time, leveraging a single wireless radio module. This may be achieved by fast switching the BLE and Zigbee device operations over time such that the device remains connected and operates in both networks simultaneously. The possibility of having a constrained device operating simultaneously on a BLE and a Zigbee networks opens up new solutions to improve limitations of these existing technologies. BLE is a low-power/low-cost wireless network technology enabling single-hop communication in a star topology between a master node and a limited number of power-constrained slave nodes. BLE provides energy-efficient connectivity between power-constrained slave devices and a less power-constrained master device. An example of a BLE network may consist of a mobile telephone device as master, which can provide Internet connectivity to an eco-system of resource constrained devices such as sensors, wearables, and building automation devices. BLE beacon devices broadcast their identifier via a beacon to nearby portable electronic devices. This technology enables smartphones, tablets and other devices to perform actions when in close proximity to a beacon. Bluetooth beacon devices use BLE proximity sensing to transmit a universally unique identifier picked up by a compatible app or operating system. The identifier and several bytes sent with it can be used to determine the device's physical location, track customers, or trigger a location-based action on the device such as a check-in on social media or a push notification.

Figure 1:
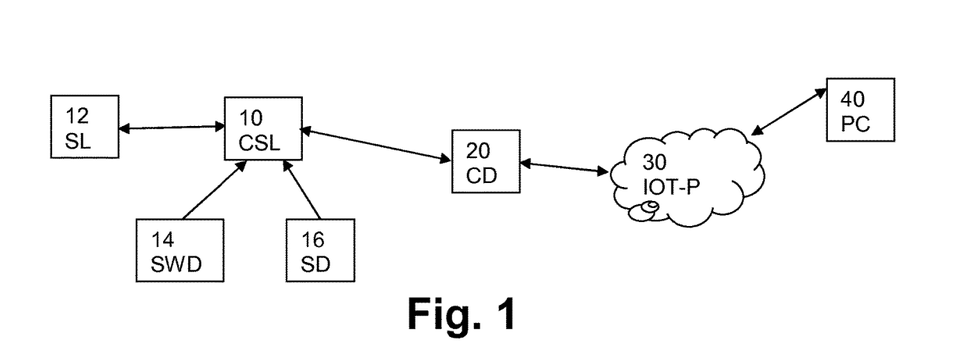
FIG. 1 shows a schematic architecture of a wireless lighting network with software gateway functionality by an external commissioning device according to various embodiments.

FIG. 1 shows a schematic architecture of a multi-hop Zigbee lighting network in which embodiments of the present invention can be implemented. The network comprises one or more luminaire devices 10, 12 as smart lamps (SL, CSL) installed or otherwise deployed in an environment, arranged to emit illumination in into that environment. One of the luminaire devices 10, 12 is a combo luminaire device (combo smart lamp (CSL)) with Zigbee and BLE connectivity. The environment may be an indoor space such as one or more rooms and/or corridors of a building; or an outdoor space such as a park, garden, road, or outdoor parking area; or a partially covered space such as a stadium, structured parking facility or gazebo; or any other space such as an interior of a ship, train or other vehicle; or any combination of such possibilities.

Each of the luminaire devices 10, 12 comprises at least one respective lamp such as a light emitting diode (LED) based lamp, gas-discharge lamp or filament bulb, plus any associated support, casing or other such housing. Each of the luminaire devices 10, 12 may take any suitable form such as a ceiling or wall mounted luminaire, a free-standing luminaire, a wall washer, a chandelier; or a less conventional form such as embedded lighting built into an item of furniture, a building material such as glass or concrete, or any other surface.

The luminaire devices 10, 12 are equipped with a wireless communication interface allowing them to be controlled remotely by lighting control commands received from a user device such as a smartphone, tablet, laptop or desktop computer, or a wireless switch device (SWD, e.g., a wall switch) 14, and/or based on sensor readings received from one or more remote sensors (SD) 16.

The communication interface can be included directly within the luminaire devices 10, 12 themselves (e.g., in the end-cap of a retrofittable replacement for a filament bulb or fluorescent tube). For example, this can allow a user, through the user device, to turn the luminaire device's illumination on and off, to dim the illumination level up or down, to change the color of the emitted illumination, and/or to create a dynamic (time varying) lighting effect. In one form, the communication interface is configured to receive the lighting control commands and/or to share sensor data via a local, short-range radio access technology such as Wi-Fi, 802.15.4, Zigbee or Bluetooth.

One type of connected luminaire device may be an instant-fit "tube LED" (TLED) lamp which retrofits into a luminaire designed for traditional fluorescent tubes. According to the instant-fit TLED approach, the existing fixed-output fluorescent ballast, the TLED lamp-holders, and also all the electrical wiring within the luminaire device remain unchanged. Via straightforward re-lamping, existing "dumb" fluorescent tubes (or even "dumb" TLED tubes) can be exchanged with dimmable connected TLEDs each having an individual, integrated wireless radio.

Furthermore, in an embodiment, an additional gateway or bridge device (not shown) may be employed as a Zigbee transceiver to communicate with the luminaire devices 10, 12. The bridge device may connect to a home router via Ethernet or WiFi. The connected luminaire devices can be physically turned on and off using the switch device 14. To turn on or off as well as to change color and brightness of the light, a manufacturer- or third-party app on a mobile device (or a computer) may be required. The user can use the app to send commands via the Internet and/or home router to the bridge, which translates the commands into Zigbee command frames and transmits them to the luminaire devices 10, 12. There may also exist remote controls or dimmer switches (not shown) that can directly send Zigbee commands to the luminaire devices 10, 12 without connecting to the home router.

However, the whole system may as well be implemented as a simple stand-alone system with e.g. only a plurality of combo luminaire devices and commissioning device, while the commissioning device is used for both commissioning and control.

According to FIG. 1, the multi-hop Zigbee lighting network is connected to an external BLE commissioning/control tool or device (CD) 20 (e.g. a dedicated commissioning/control device or a commissioning/control application running on a mobile user terminal such as a mobile phone, smartphone, tablet, laptop or the like) via a BLE point-to-point connection.

Typically, the commissioning process may involve picking up a master luminaire device 10, connecting to it via the BLE connectivity and sending a BLE command to open a Zigbee network. Then, a trigger joining process or an automatic joining process may be initiated for remaining luminaire devices to form the ZigBee network. If the trigger joining process is used, the BLE connectivity can be used as an interface to identify the luminaire device before a trigger command is sent to it via the BLE interface. Then, after the ZigBee network is established, the installer or user can use the master luminaire device 10 as an entry point to control the lamps in the ZigBee network if e.g. roaming or re-entry is needed.

The control message sent from the commissioning/control device 20 may be in a ZigBee command format. It can be transferred via the BLE interface to the master luminaire device 10 and then relayed to a destination luminaire device via the ZigBee connectivity.

The commissioning/control device 20 is thus provided with a gateway or bridge functionality (e.g. which can be implemented by software). During commissioning, a commissioning technician (e.g. an installer) can stand underneath or next to each luminaire device that he or she intends to commission (or in visible vicinity of it) and select what he or she believes to be the luminaire device on the user interface of the commissioning device 20.

It is however noted that getting under the luminaire device 10 to identify it first before starting a joining process is one option only. As an alternative, a received signal strength indicator (e.g. BLE RSSI) may be used to identify nearby luminaire devices.

The commissioning/control device 20 then broadcasts a commissioning request comprising an identifier of the selected luminaire device, and in response the luminaire device having that identifier will emit a visual indication (e.g. by blinking via its lamp(s) or a separate indicator light). This way the technician can check whether the selected luminaire is indeed the luminaire that he or she intends to commission. If so, the technician then confirms this to the commissioning device 20, and in response the commissioning device 20 adds the confirmed luminaire device to the Zigbee network for controlling the lights in a subsequent operational phase. The commissioning technician then repeats this for each luminaire device to be commissioned (e.g. every luminaire device in the office).

As an alternative, sometimes also pointing methods are applied to identify a specific luminaire device during the commissioning process. One example is an infrared remote control being directly pointed to the luminaire device featuring an infrared receiver. Another approach is to select a luminaire device by shining a high-powered torchlight into the daylight sensor of the selected luminaire device.

To establish a BLE connection, the BLE commissioning/control device 20 sends BLE packets to the BLE/Zigbee combo luminaire device 10 that receives the BLE packets, e.g., during alternating short time intervals where it is operating as BLE device, i.e., in case the combo luminaire/control device 20 is adapted to switch between different protocol stacks. As an alternative, two sets of radios may be adapted to run simultaneously if the design of the RF and base band processing stages support it.

The gateway functionality of the commissioning device 20 offers a solution to automatically setup a new Zigbee connection to a selected combo luminaire device, such as the combo luminaire device 10 of FIG. 1. This can be achieved by providing the BLE connection to the combo luminaire device and setting up an additional connectivity of the commissioning/control device 20 e.g. via a mobile network connection (e.g. 4G LTE) to an Internet of Things (IoT) cloud platform 30 where applications and services of the lighting network are controlled via a computer device (PC) 40.

According to various embodiments, the initially explained wireless coverage issue can be addressed by enabling a kind of handover from one smart luminaire device to another, while it is assumed that more smart luminaire devices with the capability to become a master device are provided. A handover to another combo luminaire device is thus needed to ensure a stable wireless connection during commissioning.

To facilitate the handover process, the commissioning/control device 20 needs to identify those luminaire devices that belong to the same Zigbee network to continue commissioning and configuration workflow or control. Among all Bluetooth beacon information it can scan and find on the spot, it needs to be able to identify a luminaire device as new master lamp candidate for commissioning.

According to various embodiments, handover can be supported by having the commissioning/control device 20 select one of the combo luminaire devices that have already joined the network, based on the Bluetooth beacons broadcast by the combo luminaire devices.

According to a first embodiment, it is therefore proposed that a combo luminaire device with a Zigbee/BLE combo chip in the proposed BLE gateway enabled lighting control system operates in different states, e.g., a factory new state, an associated state, and an optional special operation state. Of course, other optional states could be added as well.

In the factory new state, the combo luminaire device (e.g. the combo luminaire device 10 in FIG. 1) broadcasts a connectable beacon information to solicit a connection from the commissioning/control device 20. If it is then chosen as a master device, then the commissioning device 20 uses it as a proxy to carry control commands for the Zigbee lighting network. Other luminaire devices (e.g. the luminaire device 12 in FIG. 1) will automatically join the master luminaire device if a Zigbee network is opened. Or, they can also be triggered to join the Zigbee network via a BLE control message.

Once a combo luminaire device has joined the Zigbee lighting network, it will switch to a different beacon format, in which its broadcast beacon information will include an indication or an identification of the Zigbee network information.

Thus, in case the commissioning/control device 20 needs to handover to another luminaire device, it will scan to find a new master luminaire device candidate that broadcasts a beacon with the a Zigbee network information that indicates the same lighting network.

As an additional option, some of the luminaire devices may also be configured with a special beacon information to switch to the special operation state. The special beacon information may be sent by the commissioning/control device 20 to enable a certain application at the luminaire device.

Hence, according to various embodiments, combo luminaire devices are configured to change their beacon information to support an identification of their Zigbee network.

Figure 2:
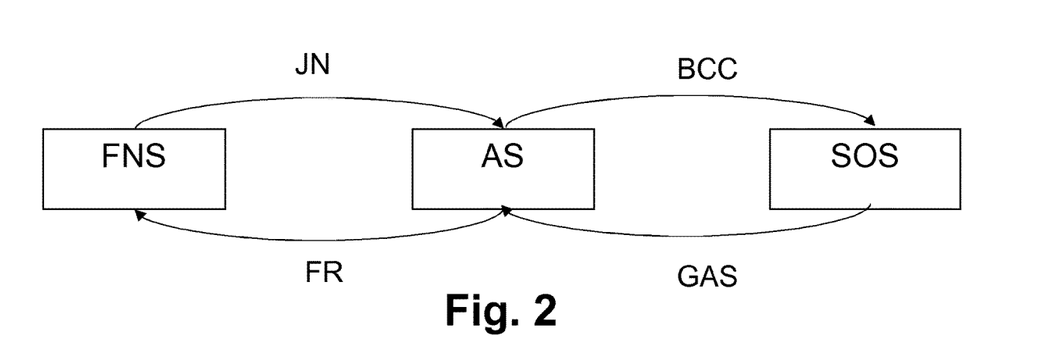
FIG. 2 shows a schematic diagram indicating state transitions of a network device according to a first embodiment.

FIG. 2 shows a schematic state transition diagram with the available beacon states according to the first embodiment. There are three beacon states that a luminaire device will operate in a lighting network that uses a BLE gateway functionality.

In the factory new state (FNS), the luminaire device has not joined any wireless network yet. It thus broadcasts a BLE beacon with information including e.g. its unique identification (ID), manufactory information and application information.

If the luminaire device determines that it has joined a wireless network (JN), it enters the associated state (AS). In this state, its beacon information will now contain an identification (ID) of the joined wireless network and other application information. As an example, the wireless network ID can be identified by the coordinator IEEE address and/or the Zigbee network personal area network identification (PANID). The beacon message may for example be derived from a hash function of the wireless network ID. This hash function may be the message digest algorithm MD5 or the secure hash algorithm SHA-1 or any other suitable hash function. The MD5 algorithm is a hash function producing a 128-bit hash value. SHA algorithms are a family of cryptographic hash functions published by the National Institute of Standards and Technology (NIST) as a U.S. Federal Information Processing Standard (FIPS), where SHA-1 is a 160-bit hash function which resembles the earlier MD5 algorithm.

The commissioning/control device 20 will perform the same algorithm, as performed by the luminaire device, on pre-known network identification and compare the local result with the one received in the beacon message from the luminaire device. By doing so, the commissioning/control device 20 can identify those luminaire devices that belong to the same Zigbee network or identify a luminaire device that belongs to a Zigbee network that it intends to commission or control.

The wireless network ID may be identified by the extended PANID of the Zigbee lighting network. As an alternative, a universally unique identifier (UUID), which is a 128-bit number used to identify information in computer systems, may be used to identify the wireless lighting network, while the major and minor fields could be used to identify the device in the network.

The beacon format may fit to the iBeacon specification which is a protocol developed in 2013. Various vendors have since made iBeacon-compatible hardware transmitters—typically called "beacons"—a class of BLE devices that broadcast their identifier to nearby portable electronic devices. The technology enables smartphones, tablets and other devices to perform actions when in close proximity to an iBeacon device.

As an alternative, the beacon format may correspond to the Eddystone specification (renamed from its former name UriBeacon). Beacons with support from Eddystone are able to transmit three different frame-types, which work with both iOS and Android operating systems. A single beacon can transmit one, two or all three frame types, which are URL (i.e. a website link), UID (similar to UUID) or TLM (telemetry). As an example, an Eddystone-UID frame may be used to broadcast an opaque, unique 16-byte beacon ID composed of a 10-byte namespace and a 6-byte instance. The namespace portion of the ID may be used to identify the wireless network, while the instance ID may be used to identify individual devices in the network. The division of the ID into namespace and instance components may also be used to optimize BLE scanning strategies, e.g. by filtering only on the namespace.

In the associated state, the luminaire device could also be configured into the special operation state (SOS) by a beacon configuration command (BCC) received from the commissioning device 20. In the special operation state, the beacon information sent by the luminaire device is thus configured by the commissioning/control device 20. As an example, the luminaire device may be configured to send no BLE beacon at all. In another example, the luminaire device may be configured to send out a BLE beacon with a predetermined beacon information configured by the smart device. In yet another example, only a part of the beacon information may be configured by the commissioning/control device 20.

As can be gathered from the state transition diagram of FIG. 2, the commissioning device 20 may kick the luminaire device from the special operation state back into the associated state by using a go-to-associated-state command (GAS) so that the luminaire device broadcasts the associate state beacon information.

Finally, with a factory reset (FR) the luminaire device can be set back into the factory new state.

In the following, a handover control procedure at a commissioning device with BLE software gateway functionality according to a second embodiment is described with reference to a flow diagram shown in FIG. 3. The procedure may run in the background of a commissioning process.

In step S301, the commissioning device establishes a connection with a combo luminaire device selected as master device to form a software gateway during commissioning, configuration and maintenance. Then, in step S302, the commissioning device measures the quality of the wireless connection to the selected master device (e.g. based on a measured signal strength or other suitable quality parameter). In the next step S303, the commissioning device compares the measured quality parameter with a preset threshold to determine whether a handover to another luminaire device is needed. If not, the procedure returns to step S302 and initiates a new measurement of the quality parameter. On the other hand, if the commissioning device determines in step S303 that the connection quality as measured by the quality parameter has dropped below the required quality, the procedure proceeds to step S304 where a handover procedure is initiated by selecting a new master device based on received BLE beacon information that indicates a combo luminaire device in the associated state of the same Zigbee lighting network threshold. Finally, in step S305, the commissioning device establishes a new connection with the selected new master device to maintain the software gateway functionality and continue commissioning, configuration and maintenance. Thereby, a handover to another master device has been achieved to ensure a stable wireless connection. Now, the procedure may return to step S302 to continue measuring the connection quality until a new handover is required.

To facilitate the handover process, the commissioning device may continuously check for and store received beacon information of potential master devices that belong to the same ZigBee network. Among all the BLE beacon information it can scan and find on the spot, it continuously or intermittently identifies combo luminaire devices as master lamp candidates for the next handover process.

In the following, a state transition control procedure at a combo luminaire device with BLE connectivity according to a third embodiment is described with reference to a flow diagram shown in FIG. 4. The procedure may run in the background of usual lighting control processes or other application processes at the luminaire device.

In step S401, the luminaire device is switched on and enters the factory new state. Then, in step S402, the luminaire device generates and broadcasts a BLE beacon with a default beacon information including e.g. its unique device identification (ID), manufactory information and application information.

In the next step S403, the luminaire device checks whether it has meanwhile joined a Zigbee network. If not, the procedure returns to step S402 and the luminaire device keeps on broadcasting the state-specific beacon information of the factory new state.

On the other hand, if it is determined in step S403 that the luminaire device has joined a Zigbee network, the procedure proceeds to step S404 where the luminaire device enters the associated state. Then, in step S405, the luminaire device generates and broadcasts a BLE beacon with a state-specific beacon information that will now contain a unique IEEE address which could be the IEEE address of the coordinator or it could be the IEEE address of the luminaire device. Thus, the beacon contains both an ID of the network (PANID) and the unique ID that can be used to trace the network information.

The assumption here is that all the IEEE addresses of all luminaire devices are recorded in a backend of the network. If the PANID of the network changes, the commissioning device can still figure out which network it connects to by using the unique IEEE address.

Optionally, some other application information may be added to the beacon, e.g., with a beacon format as discussed in connection with the above first embodiment.

In the next step S406, the luminaire device checks whether it has received a beacon configuration demand, e.g., from a commissioning device. If not, the procedure returns to step S405 and the luminaire device keeps on broadcasting the state-specific beacon information of the associated state with the network identification.

On the other hand, if it is determined in step S406 that the luminaire device has received a beacon configuration command, the procedure proceeds to step S407 where the luminaire device enters the special operation state and modifies its beacon according to the beacon information received with the beacon configuration command. Then, in step S408, the luminaire device broadcasts a state-specific beacon according to the beacon information received with the beacon configuration command (which includes broadcasting no beacon at all).

In the next step S409 the luminaire device checks again whether it has received a beacon configuration demand. If not, the procedure returns to step S408 and the luminaire device keeps on broadcasting a state-specific beacon according to the beacon information received with the beacon configuration command (which includes broadcasting no beacon at all).

On the other hand, if it is determined in step S409 that the luminaire device has received a new beacon configuration command, the procedure proceeds to step S407 where the luminaire device enters the special operation state and modifies its beacon according to the beacon information received with the new beacon configuration command. Then, in step S408, the luminaire device broadcasts a state-specific beacon according to the beacon information received with the new beacon configuration command (which includes broadcasting no beacon at all).

Figure 4:
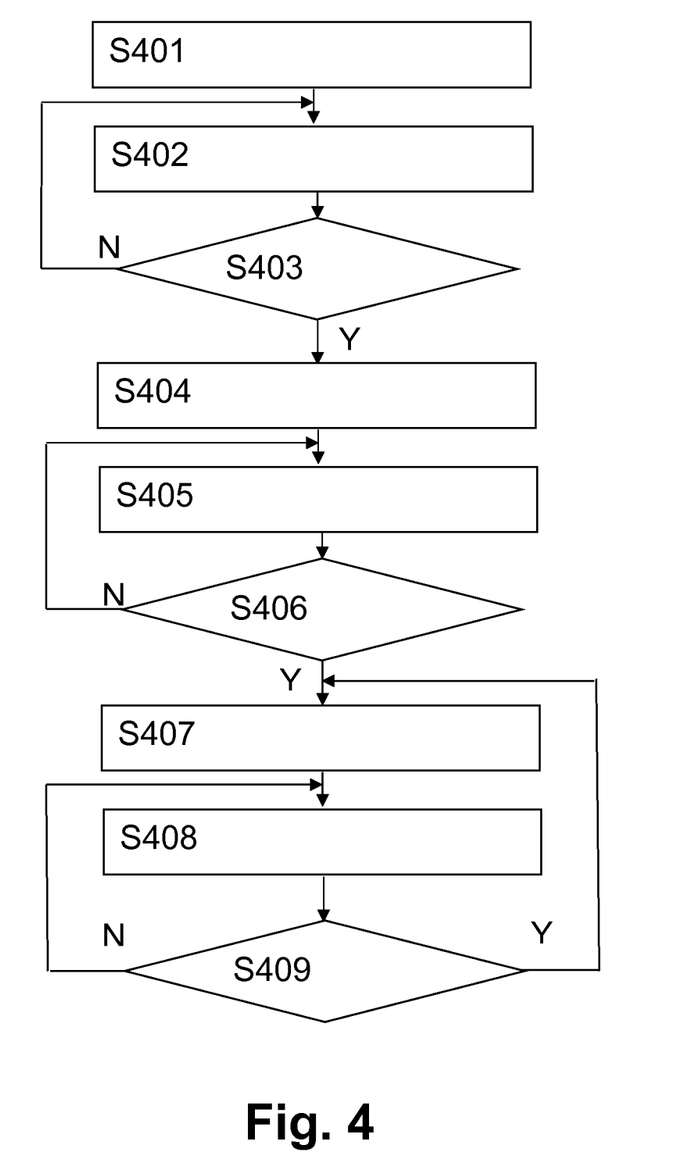
FIG. 4 shows flow diagram of a state transition control procedure at a network device according to a third embodiment.

The loop of steps S409 and S407 or S408 can be continued until e.g. a go-to-associated-state command is received and the procedure returns to step S404 where the luminaire device enters the associated state again (not shown in FIG. 4).

The above embodiments offer a reliable Zigbee commissioning handover mechanism for large networks. The invention can equally be applied to other Zigbee devices such as switches, sensors, etc. Furthermore, the proposed procedures of joining the network and selecting master devices based on received beacon information can be provided in other types of wireless networks as well.

To summarize, methods and apparatuses have been described for controlling commissioning and/or control of a combo network device with dual connectivity in a wireless network by using a smart device. In a factory new state, the combo network device has not yet joined any wireless network by its first connectivity (e.g. Zigbee) and thus broadcasts a beacon with beacon information to solicit a connection from the smart device by its second connectivity (e.g. BLE). If the combo network device joins a wireless network, it enters an associated state in which the beacon information will now contain an identification of the wireless network. Thus, the beacon information changes based on the status of the combo network device and can thereby support a handover process for an installer or controller.

While the invention has been illustrated and described in detail in the drawings and foregoing description, such illustration and description are to be considered illustrative or exemplary and not restrictive. The invention is not limited to the disclosed embodiments. The proposed joining procedures can be applied to and possibly standardized in other types of multi-hop networks and with other types of messages and control fields. Moreover, the invention can be applied in any product that implements a wireless network (e.g. Zigbee or others) interfacing with another wireless network (e.g. BLE or others). An example includes a large-scale Zigbee lighting network where single light-points are commissioned using a mobile device such as smartphone or tablet via BLE. In various embodiments of the present invention, combined radio devices (also called "combo devices") with BLE and Zigbee transmission capability are used. The present invention is equally applicable to any other combination of a first wireless technology (e.g. BLE, Infrared (IR), near field communication (NFC), wireless local area communication (Wi-Fi)) with a second wireless (e.g. multi-hop) technology (e.g. Zigbee PRO, Thread, WirelessHART, SmartRF, CityTouch, IP500, and any other mesh or tree-based technology). Moreover, the app-based control is a mere example. Other user interfaces with other types of input operations (e.g. hardware switches or buttons, audio control, etc.) could be provided at the commissioning device.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

As an example, in the above embodiments, the terms "wireless network", "multi-hop network" and "point-to-point connection" shall be interpreted in a sense to cover a network architecture with only one bridge and one network node (e.g. luminaire device). Additionally, the term "bridge device" shall be understood to cover any controller device or other device with a bridge-type functionality, such as a case where one of the luminaire devices, switch devices, or sensor devices takes that role of the bridge device. As an example, the bridge functionality might be integrated in another combo radio device, which has previously been paired to the phone via the single-hop connection (e.g. BLE), and has setup a Zigbee network. Then, this combo radio device could function both as network device (e.g. luminaire device) and as bridge device.

A single unit or device may fulfill the functions of several items recited in the claims. The mere fact that certain measures are recited in mutually different dependent claims does not indicate that a combination of these measures cannot be used to advantage.

Figure 3:
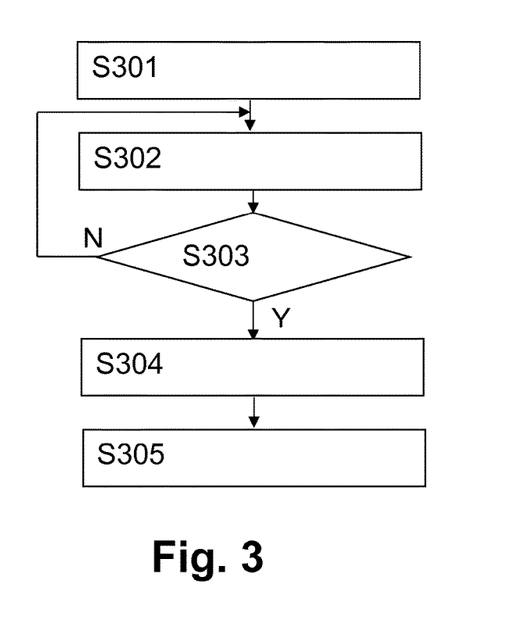
FIG. 3 shows a flow diagram of a handover procedure at a commissioning device according to a second embodiment.

The described operations like those indicated in FIGS. 3 and 4 can be implemented as program code means of a computer program and/or as dedicated hardware of the commissioning device or luminaire device, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. An apparatus for control of a wireless network comprising a plurality of network nodes interconnected with a first connectivity via a point-to-point connection of a second connectivity to a master device which provides the first connectivity and the second connectivity, the master device being one of the plurality of the network nodes, the first connectivity being different from the second connectivity, wherein the apparatus is adapted
   to establish the point-to-point connection of the second connectivity to the master device;
   to select one of the plurality of network nodes as a potential new master device which also provides the first connectivity and the second connectivity, based on a network identification of the wireless network derived from a beacon signal received from the potential new master device via the second connectivity, the network identification being identifying the plurality of network nodes belonging to the wireless network; and
   to hand over the point-to-point connection from the master device to the selected potential new master device.

2. The apparatus of claim 1, wherein the apparatus is adapted to use the point-to-point connection for initiating a joining procedure for the network node by the master device using the first connectivity.

3. The apparatus of claim 1, wherein the apparatus is adapted to provide a gateway functionality for the wireless network via the point-to-point connection.

4. The apparatus of claim 1, wherein the first connectivity is provided by a Zigbee connection and the second connectivity is provided by a Bluetooth connection.

5. A control device in a lighting system, the control device comprising an apparatus as claimed in claim 1.

6. A network node for control in a wireless network comprising a plurality of network nodes interconnected with a first connectivity, the wireless network being controlled by an apparatus via a point-to-point connection of a second connectivity, the first connectivity being different from the second connectivity, wherein the network node is adapted to change a content of a beacon signal of the network node so as to add a network identification of the wireless network to the beacon signal in response to a detection that the network node has joined the wireless network, the network identification being identifying the plurality of network nodes belonging to the wireless network and to broadcast the beacon signal from the network node by using the second connectivity.

7. The network node of claim 6, wherein the network node is adapted to change the content of the beacon signal so as to indicate a special operation state in response to a receipt of beacon configuration command, and to configure the beacon signal based on a beacon information included in the beacon configuration command.

8. The network node of claim 6, wherein the first connectivity is provided by a Zigbee connection and the second connectivity is provided by a Bluetooth connection.

9. The network node of claim 6, wherein the network identification is identified by at least one of a coordinator IEEE address, a normal node IEEE address, and a personal area network identification.

10. A luminaire device for a lighting system, the luminaire device comprising the network node as claimed in claim 6.

11. A lighting system comprising at least one control device as claimed in claim 5.

12. A method of controlling a wireless network comprising a plurality of network nodes interconnected with a first connectivity via a point-to-point connection of a second connectivity to a master device which provides the first connectivity and the second connectivity, the master device being one of the plurality of the network nodes, the first connectivity being different from the second connectivity, wherein the method comprises:
    establishing the point-to-point connection of the second connectivity to the master device;
    selecting one of the plurality of network nodes as a potential new master device, which also provides the first connectivity and the second connectivity, based on a network identification of the wireless network derived from a beacon signal received from the potential new master device via the second connectivity, the network identification being identifying the plurality of network nodes belonging to the wireless network; and
    handing over the point-to-point connection from the master device to the selected potential new master device.

13. A method in a network node of a wireless network comprising a plurality of network nodes interconnected with a first connectivity, the wireless network being controlled by an apparatus via a point-to-point connection of a second connectivity, the first connectivity being different from the second connectivity, wherein the method comprises:
    changing a content of a beacon signal so as to add a network identification of the wireless network to the beacon signal in response to a detection that the network node has joined the wireless network, the network identification being identifying the plurality of network nodes belonging to the wireless network; and
    broadcasting the beacon signal by using the second connectivity.

14. A non-transitory computer readable storage medium comprising a set of instructions which, when executed by a computer, cause the computer to perform the steps of claim 12.

15. A non-transitory computer readable storage medium comprising a set of instructions which, when executed by a computer, cause the computer to perform the steps of claim 13.

* * * * *